United States Patent [19]

Garbrecht et al.

[11] 4,187,465
[45] Feb. 5, 1980

[54] DEVICE FOR PROTECTION AGAINST TRANSMISSION ERRORS IN AN INFORMATION TRANSMISSION SYSTEM

[75] Inventors: Kurt Garbrecht, Neuried; Bernhard Hildebrandt, Hochbrück, both of Fed. Rep. of Germany

[73] Assignee: Siemens Aktiengesellschaft, Berlin & Munich, Fed. Rep. of Germany

[21] Appl. No.: 787,600

[22] Filed: Apr. 14, 1977

[30] Foreign Application Priority Data

Apr. 26, 1976 [DE] Fed. Rep. of Germany ....... 2618148

[51] Int. Cl.² .......................................... H04B 1/00
[52] U.S. Cl. .............................. 325/31; 340/146.1 A; 340/159; 325/364; 246/15
[58] Field of Search ................. 325/31, 460, 323, 362, 325/363, 364, 481, 473; 340/146.1 R, 146.1 A, 159; 246/1 C, 3, 5, 7, 9, 14, 15

[56] References Cited

U.S. PATENT DOCUMENTS 3,445,663  5/1969  Jones et al. ........................ 325/323

FOREIGN PATENT DOCUMENTS 1442914  7/1976  United Kingdom.

OTHER PUBLICATIONS

Microwave System Sicarid TCL for Track to Train Information Transfer, Siemens, pp. 1–5.

Primary Examiner—Robert L. Griffin
Assistant Examiner—Tommy P. Chin
Attorney, Agent, or Firm—Hill, Van Santen, Steadman, Chiara & Simpson

[57] ABSTRACT

A device is provided for protection against the presence of transmission errors in an information transmission system used in railroading. An interrogation apparatus emits a periodically variable interrogation signal within a specified frequency band consisting of successive frequency ranges. A reply apparatus selectively dampens the interrogation signal in sub-ranges of each frequency range so as to provide a frequency-selectively reflected interrogation signal which has power penetrations in the respective sub-ranges. The first switching member is provided to produce a first impulse sequence whose impulses lie centrally at the border of the sub-ranges. A comparator then determines whether the center of the power penetration lies within one of the sub-range border impulses. If such is the case, an interference signal is activated. Similarly a second switching member is provided which produces a second impulse sequence having impulses wider than those of the first impulse sequence. When the center of a power penetration lies within one of the impulses of the second impulse sequence, an alert signal is activated.

2 Claims, 3 Drawing Figures

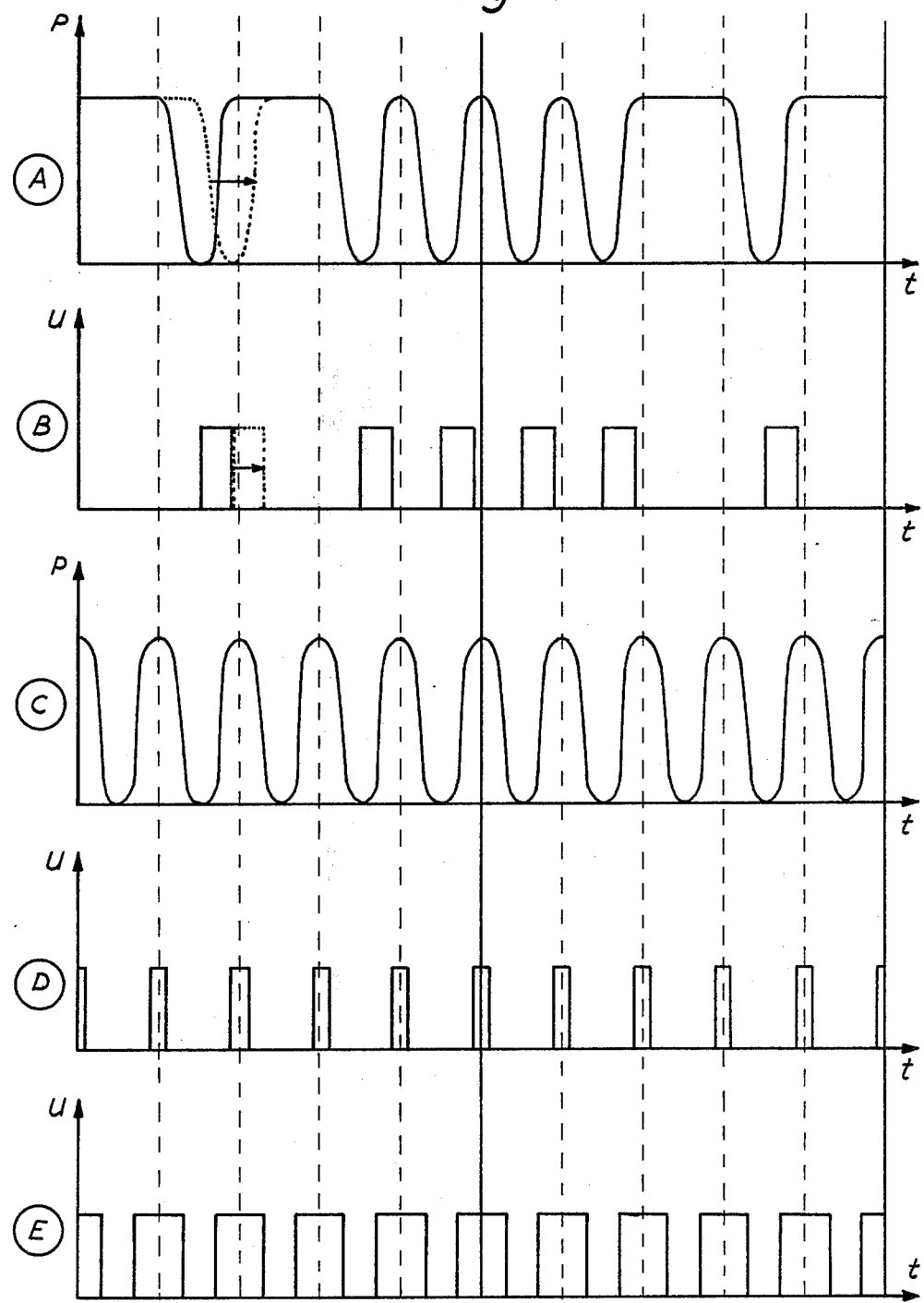

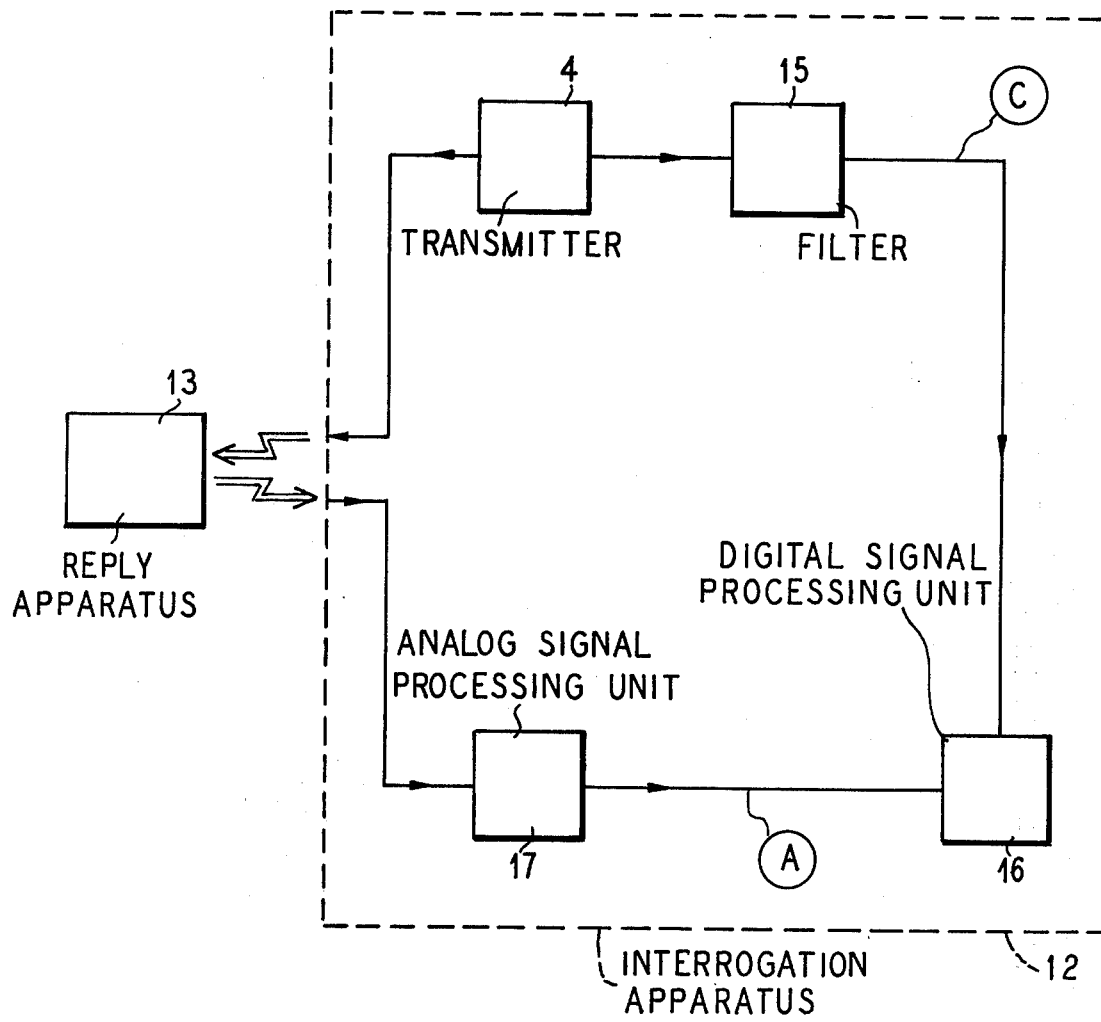

DEVICE FOR PROTECTION AGAINST TRANSMISSION ERRORS IN AN INFORMATION TRANSMISSION SYSTEM

BACKGROUND OF THE INVENTION

The invention relates to a device for protection against the presence of transmission errors in an information transmission system, particularly for railroad systems. An interrogation apparatus emits a periodically variable interrogation signal within a specified frequency band consisting of successive frequency ranges. A reply apparatus dampens in each case m of n sub-ranges of each frequency range of the interrogation signal in accordance with an item of information to be transmitted, so that the interrogation signal which is frequency-selectively reflected from the reply apparatus to the interrogation apparatus has characteristic power penetrations in the respective sub-ranges.

Such a system for point by point information transmission between an active interrogation apparatus and a passive reply apparatus is, for example, known from the publication "Microwave System SICARID TCL" of Siemens AG. This system, depending on the use of the system components for vehicle information or distance information, can be used for the transmission of vehicle data or of distance data to a vehicle. The sensitive interrogation apparatus is in each case carefully protected whereas the reply apparatus is exposed to rough surrounding conditions. For this reason, the reply apparatuses are produced as solid cast metal components in which the resonance circuits of the reply apparatus for damping the interrogation signal are formed as hollow resonators. Common resonance frequency displacements of all hollow resonators resulting from temperature fluctuations of the surroundings can, for example, be compensated for in the interrogation apparatus with the aid of a device in accordance with British Letters Patent No. 1,442,914.

However, under unfavorable conditions in which the resonant frequency of a single hollow resonator in the reply apparatus is altered because of gradually appearing corrosion symptoms, the alteration of one of such m resonant frequencies of a sub-range can, under certain conditions, cause an information adulteration which is not recognizable.

SUMMARY OF THE INVENTION

An object of the invention is to create a device which safely recognizes and signals the alteration of the resonant frequency of a single resonator resulting from interfering effects.

This object is achieved by providing switching means in the interrogation apparatus using an impulse sequence, the impulses of which lie centrally on the boundary of all of said sub-ranges, and that a signal device gives off an interference signal if a comparator determines that the center of a power penetration lies within the pulse width of the impulse.

BRIEF DESCRIPTION OF THE DRAWINGS

FIG. 1 illustrates five signals essential for the function of the device of this invention;

FIG. 1A illustrates a prior art transmission system with which the device of this invention is utilized.

DESCRIPTION OF THE PREFERRED EMBODIMENTS

Figure 2:
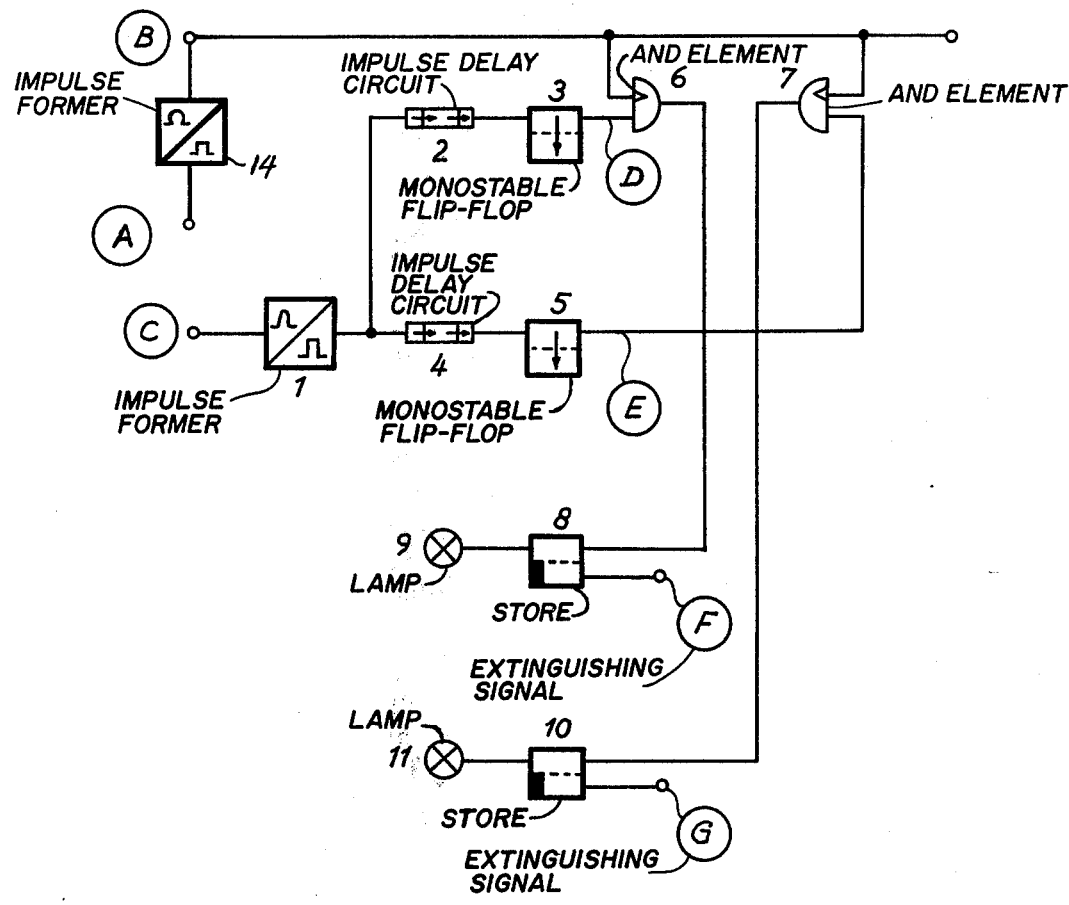
FIG. 2 illustrates a preferred embodiment of the invention.

Five signals are referenced with the letters A through E in FIG. 1 which, as indicated by the auxiliary reference lines, are arranged in synchronous fashion beneath one another. The time between two reference lines corresponds with the time for varying the interrogation signal through a sub-range of one of the frequency ranges. In this example, only a time span across 10 sub-ranges is illustrated corresponding with the time for varying two frequency ranges. However, this represents only a fraction of the time length required for the complete varying of the interrogation signal. Each fifth auxiliary line is drawn as a continuous line, whereas the intermediary auxiliary lines are illustrated as broken lines.

Signal A corresponds with the output of the interrogation signal which is frequency-selectively reflected from the reply apparatus 13 to the interrogation apparatus 12 shown in FIG. 1A. The three respective power penetrations characteristic for the ($\frac{5}{3}$) code selected for this information transmission, can clearly be recognized in the drawing as the two ranges of five sub-ranges.

The alteration of a power penetration is illustrated by means of an auxiliary arrow and a dotted line, as can occur, for example, if the respective hollow resonator corrodes.

The signal B is formed from the signal A in the interrogation apparatus, 12 by an impulse former 14 shown in FIG. 2 and discussed hereafter. The ascending sides of the rectangular-shaped voltage impulses of the signal B formed by the impulse former 14 in each case lie centrally with respect to the center of the respective power penetrations of the signal A. The length of these rectangular-shaped voltage impulses is smaller than the time-length for varying a sub-range. In accordance with FIG. 1, the shifting of a power penetration beam is indicated by means of an auxiliary arrow and dotted line in the graph for signal A. The corresponding shift of a rectangular-shaped voltage impulse of signal B is also indicated by means of an auxiliary arrow and dotted line.

Signal C as a clock signal is obtained in the interrogation apparatus 12 with the effect of resonance circuits on the interrogation signal which effect the power penetrations in each of the provided sub-ranges. Signal C in the known device as disclosed in the SICARID TCC Publication noted previously serves the purpose of forming a raster of sub-ranges to which the power penetrations of the interrogation signal reflected by the reply apparatus 13 can be matched up with.

Signal D is used for performing the function of the device of this invention. Signal D comprises a sequence of rectangular-shaped voltage impulses which are narrow in comparison with the width of a sub-range. These voltage impulses lie centrally of the borders of each of the sub-ranges.

Signal E corresponds with the signal D, except for the fact that the voltage impulses have a larger width, such width still being smaller than the width of a sub-range, however.

FIG. 1A illustrates the information transmission system for railroad systems illustrated in the SICARID Publication and which is utilized by the invention in one preferred embodiment. The transmitter 4 sends a frequency varying signal to the reply apparatus 13. Certain tuned circuits in the reply apparatus 13 damp certain sub-ranges of the transmitted interrogation signal so that the signal received by the analog signal processing unit 17 has predetermined power penetrations therein. A signal A results at the output of the unit 17 which is fed to the digital signal processing unit 16. Simultaneously, the interrogation signal from the transmitter 4 is connected to a filter 15 which creates a power penetration in each of the sub-ranges as shown by the signal C in FIG. 1. This is also fed to the digital signal processing unit 16.

FIG. 2 illustrates a device in accordance with the invention. The signals D and E required for the function of the device are formed from signal C. Accordingly, signal C is conveyed to an impulse former 1 forming a succession of rectangular-shaped voltage impulses from signal C. Two circuit branches are connected to the output of the impulse former 1. The first has an impulse delay circuit 2, and a monostable flip-flop 3, and the second has an impulse delay circuit 4, and a monostable flip-flop 5. The delay times of the impulse delay circuits 2 and 4, as well as the resulting times for the monostable flip-flops 3 and 5 are selected in such a manner that an impulse sequence in accordance with signal D is present at the output of the monostable flip-flop 3, and an impulse sequence in accordance with signal E is present at the output of the monostable flip-flop 5.

Signal D and signal E are applied to the first static inputs of two AND-elements 6 and 7 functioning as comparators. The AND-elements 6 and 7, respectively, have a second dynamic input which reacts to ascending sides of the impulse. Signal B is applied to these two dynamic inputs. If the ascending side of an impulse of signal B falls within the time of a voltage impulse of signal D, a store 8 is set therewith, and this condition is signalled via a lamp 9. If the ascending side of an impulse of signal B falls within the time of a voltage impulse of signal E, a store 10 is set via the output of the AND-element 7, and this condition is signalled via a lamp 11. The signals of lamps 9 and 11 in each case can be extinguished by means of backspace command extinguishing signals F or G connected to the stores 8 and 10.

The gradual shift of the beam of a resonant frequency thus first effects the response of lamp 11, and at a later time the response of a lamp 9. Thus, lamp 11 can provide an alert signal whereas lamp 9 signals an interference condition.

With the shift of the beam of a resonant frequency as illustrated in FIG. 1 by means of the dotted line, lamp 11 would already have responded, and a condition would have resulted in which lamp 9 would also respond.

With the aid of the impulse delay circuits 2 and 4 and the monostable flip-flops 3 and 5, random response boundaries can be set with the device of this invention.

The invention is not limited to the sample embodiment illustrated. Rather, it is quite possible that the elements for an alert signal are not used at all. It is furthermore possible that the outputs of the stores 8 and 10 not only effect lamps 9 and 11, but are employed for example, directly in further signal analysis of the interrogation apparatus.

Although various minor modifications may be suggested by those versed in the art, it should be understood that we wish to embody within the scope of the patent warranted hereon, all such embodiments as reasonably and properly come within the scope of our contribution to the art.

We claim as our invention:

1. A system for protection against the presence of transmission errors in an information transmission system in railroad systems having an interrogation apparatus means for emitting a periodically variable frequency interrogation signal within a specified frequency band formed of successive frequency ranges, each frequency range being formed of a plurality of sub-ranges, and a reply apparatus means for dampening the interrogation signal in at least one sub-range in accordance with information to be transmitted, said reply apparatus means frequency-selectively reflecting the interrogation signal to the interrogation apparatus means and providing a characteristic power penetration in the at least one sub-range, said system comprising: a first means for producing a first impulse sequence whose impulses lie centrally at a border of all of said sub-ranges, a first comparator means, and an interference signal device means for providing an interference signal if said comparator means determines that a center of the power penetration lies within one of the impulses at the border of the respective sub-range, a second means for producing a second impulse sequence whose impulses lie centrally at the border of all of said sub-ranges and which are wider than the impulses of the first impulse sequence, a second comparator means, and an alert signal device means for providing an alert signal if said second comparator means determines that the center of the power penetration lies within one of the impulses of the second impulse sequence at the border of the respective sub-range.

2. An information system, comprising:
   (a) an interrogation apparatus means for emitting a frequency variable interrogation signal within a specified frequency range having a plurality of sub-ranges;
   (b) a reply apparatus means for selectively dampening the interrogation signal to create at least one characteristic power penetration in the interrogation signal in at least one sub-range;
   (c) said reply apparatus means including means for providing a reference signal having power penetrations within each of the sub-ranges of the specific frequency range;
   (d) means for converting the reference signal to an impulse sequence whose impulses lie centrally at borders between adjacent sub-ranges;
   (e) comparison means for comparing a center of the at least one power penetration with the impulse of the impulse sequence which lies centrally of the corresponding sub-range border and emitting a signal to trigger an indicating means if the center of the power penetration occurs at a time during which the impulse at the corresponding sub-range is occurring; and
   (f) said comparison means comprising an AND gate with a dynamic input and static input connected to receive the impulse sequence, and wherein means are connected to the damped interrogation signal for creating an information impulse having an ascending side which corresponds to the center of the power penetration, said dynamic input being connected to receive said information impulse.

* * * * *